(12) United States Patent
McFarland

(10) Patent No.: US 10,774,719 B2
(45) Date of Patent: Sep. 15, 2020

(54) REDUCTANT DOSING UNIT COMPACT SIDE FEED INLET PORT

(71) Applicant: Continental Automotive Systems, Inc., Auburn Hills, MI (US)

(72) Inventor: Robert Wayne McFarland, Smithfield, VA (US)

(73) Assignee: Vitesco Technologies USA, LLC., Auburn Hills, MI (US)

(*) Notice: Subject to any disclaimer, the term of this patent is extended or adjusted under 35 U.S.C. 154(b) by 213 days.

(21) Appl. No.: 15/239,892

(22) Filed: Aug. 18, 2016

(65) Prior Publication Data
US 2018/0051613 A1 Feb. 22, 2018

(51) Int. Cl.
 F01N 3/28 (2006.01)
 F01N 3/20 (2006.01)
 F01N 3/24 (2006.01)

(52) U.S. Cl.
 CPC ........... F01N 3/2896 (2013.01); F01N 3/208 (2013.01); F01N 3/2066 (2013.01); F01N 3/24 (2013.01); F01N 2260/10 (2013.01); F01N 2470/06 (2013.01); F01N 2470/08 (2013.01); F01N 2610/02 (2013.01); F01N 2610/14 (2013.01); F01N 2610/1453 (2013.01); F01N 2610/1493 (2013.01); Y02T 10/24 (2013.01)

(58) Field of Classification Search
 CPC ............. F01N 2260/10; F01N 2470/06; F01N 2470/08; F01N 2610/02; F01N 2610/14; F01N 2610/1453; F01N 2610/1493; F01N 3/2066; F01N 3/208; F01N 3/24; F01N 3/2896
 See application file for complete search history.

(56) References Cited

U.S. PATENT DOCUMENTS

2012/0160937 A1 6/2012 Feistritzer et al.
2013/0228231 A1* 9/2013 Nagel .................. F01N 3/2066
 137/334

(Continued)

FOREIGN PATENT DOCUMENTS

JP 5528805 B2 6/2014

OTHER PUBLICATIONS

The International Search Report and the Written Opinion of the International Searching Authority dated Oct. 11, 2017 for corresponding application PCT/US2017/047570.

(Continued)

Primary Examiner — Jason J Boeckmann

(57) ABSTRACT

A side feed inlet port for an injector, which makes use of stamped parts to form a compact, high strength three-piece inlet port at a significantly reduced cost. By using an inner sleeve and an outer sleeve, injector sealing is accomplished using the interior sleeve, creating a sealing point, while allowing for inlet conduit attachment to the outer sleeve at, above, or below the sealing point of the DEF injector. The construction of the inlet port is such that there is proper sealing between the inner sleeve and one or more seals, while allowing for the connection between the inlet conduit and the outer sleeve to reduce the overall height of the inlet port, and therefore, the injector. The position of the inlet conduit may be altered without affecting the sealing connection between the inner sleeve and the seal(s), such that the desirable overall height may be achieved.

18 Claims, 3 Drawing Sheets

(56) References Cited

U.S. PATENT DOCUMENTS

| | | | |
|---|---|---|---|
| 2014/0054394 A1* | 2/2014 | Bugos | F01N 3/10 239/132.3 |
| 2014/0138568 A1* | 5/2014 | van Vuuren | F16K 27/00 251/357 |
| 2015/0122917 A1 | 5/2015 | Shaw et al. | |
| 2016/0290520 A1* | 10/2016 | Memmer | B60K 15/03519 |

OTHER PUBLICATIONS

Korean Office Action dated Apr. 22, 2020 for the counterpart Korean Patent Application No. 10-2019-7004642.

* cited by examiner

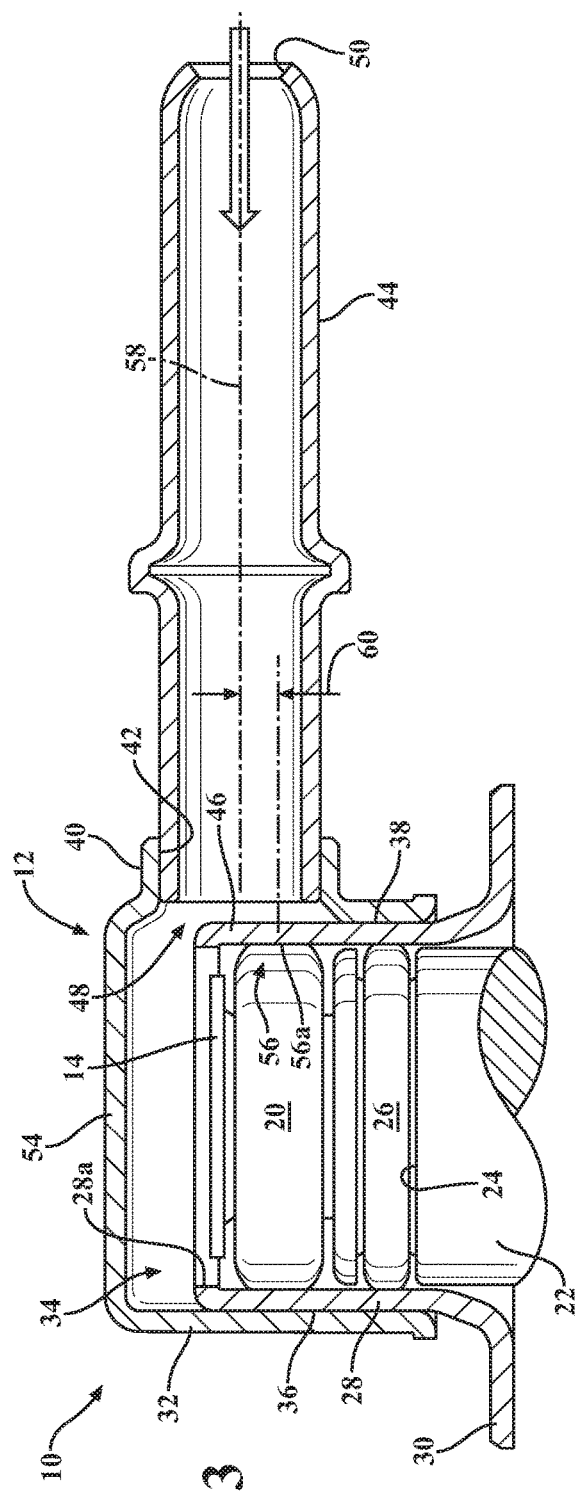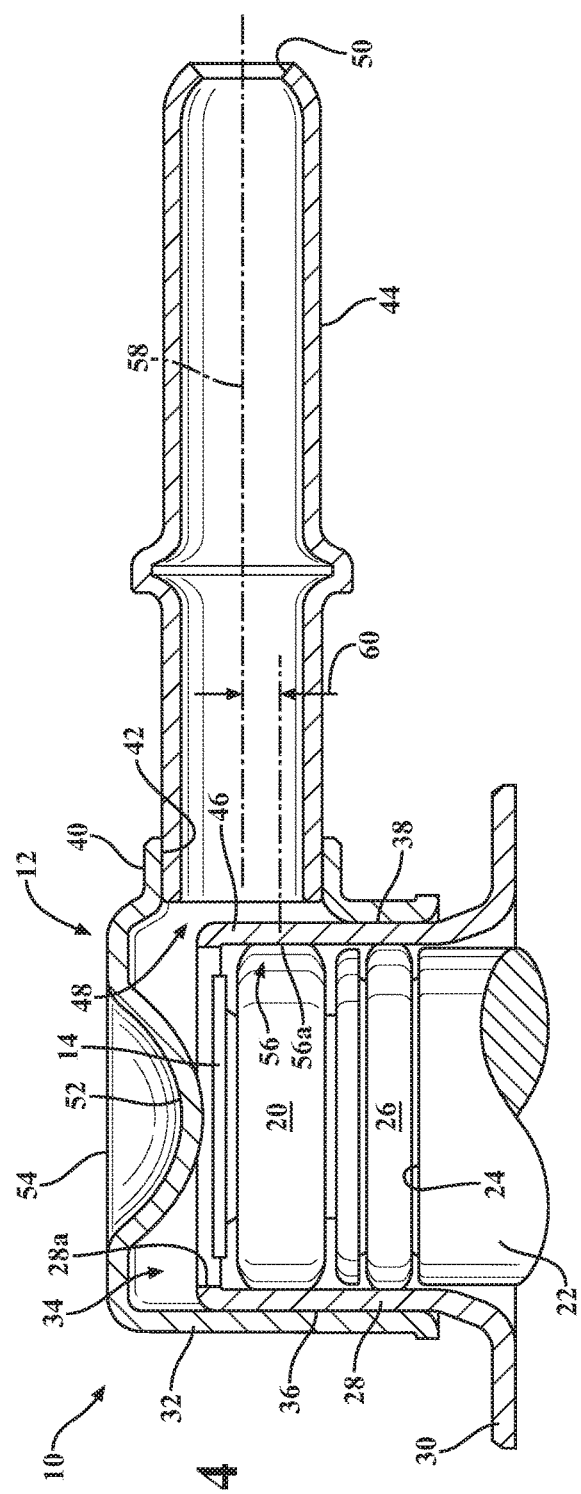

REDUCTANT DOSING UNIT COMPACT SIDE FEED INLET PORT

FIELD OF THE INVENTION

The invention relates generally to a side feed inlet port for a reductant delivery unit used as part of a selective catalytic reduction system for an exhaust after-treatment system.

BACKGROUND OF THE INVENTION

New emissions legislation in Europe and North America is driving the implementation of new exhaust aftertreatment systems, particularly for lean-burn technologies such as compression-ignition (diesel) engines, and stratified-charge spark-ignited engines (usually with direct injection) that are operating under lean and ultra-lean conditions. Lean-burn engines exhibit high levels of nitrogen oxide emissions (NOx), that are difficult to treat in oxygen-rich exhaust environments, which are characteristic of lean-burn combustion. Exhaust aftertreatment technologies are currently being developed that treat NOx under these conditions.

One of these technologies includes a catalyst that facilitates the reactions of ammonia ($NH_3$) with the exhaust nitrogen oxides (NOx) to produce nitrogen ($N_2$) and water ($H_2O$). This technology is referred to as Selective Catalytic Reduction (SCR). Ammonia is difficult to handle in its pure form in the automotive environment, therefore it is customary with these systems to use a liquid aqueous urea solution, typically at a 32% concentration of urea ($CO(NH_2)_2$). The solution is referred to as AUS-32, or diesel exhaust fluid (DEF), and is also known under its commercial name of AdBlue. The DEF is delivered to the hot exhaust stream and is transformed into ammonia in the exhaust after undergoing thermolysis, or thermal decomposition, into ammonia and isocyanic acid (HNCO). The isocyanic acid then undergoes a hydrolysis with the water present in the exhaust and is transformed into ammonia and carbon dioxide ($CO_2$), the ammonia resulting from the thermolysis and the hydrolysis then undergoes a catalyzed reaction with the nitrogen oxides as described previously.

The delivery of the DEF solution to the exhaust involves precise metering of the DEF and proper preparation of the DEF to facilitate the later mixing of the ammonia in the exhaust stream. The delivery of the DEF into the exhaust is typically achieved using some type of injector. In a Reductant Delivery Unit (RDU), the injector is surrounded by a metallic housing. The housing is used to protect the injector, and provide a mounting system to an exhaust pipe and to provide a hydraulic connection interface to the injector. With increased desire for vehicles to be more efficient, and to include more features and capabilities, packaging constraints have become increasingly more restricting.

Accordingly, there exists a need for an injector which allows for greater flexibility with regard to packaging, such that the injector may be mounted in various locations, while adhering to more strict packaging requirements.

SUMMARY OF THE INVENTION

In one embodiment, the present invention is a side feed inlet port for an injector, which makes use of three stamped parts such that the side feed inlet port is compact, high strength, and manufactured at a significantly reduced cost. By using an inner sleeve and an outer sleeve, both of which are made from stamped metal, sealing of the injector is accomplished using the interior sleeve, creating a sealing point, while allowing for the attachment of an inlet conduit to the outer sleeve at or below the sealing point of the DEF injector. The injector has one or more seals, and the construction of the inlet port is such that there is proper sealing between the inner sleeve and the seal(s), while at the same time allowing for the connection between the inlet conduit and the outer sleeve to reduce the overall height of the inlet port, and therefore, the injector. The position of the inlet conduit may be altered without affecting the sealing connection between the inner sleeve and the seal(s), such that the desirable overall height may be achieved. Assembly is accomplished by brazing or welding the components together, providing a strong, compact, and low-cost inlet port.

One of the advantages of the present invention is a reduction of overall interior fluid volume in the inlet port. For an RDU that needs to be purged of fluid at engine shut off (to mitigate the potential for freezing and subsequent damage to fluid injector), having less volume of liquid in the inlet port equates to shorter purge times. Being a stamped part, the outer sleeve may have various shapes, such as different volume reduction features, to reduce the interior volume even further.

In one embodiment, the present invention is an inlet port for an injector having an inner sleeve mounted to an inlet tube of an injector, as well as an outer sleeve, where the inner sleeve partially disposed in the outer sleeve. A cavity is formed as part of the outer sleeve such that the inner sleeve is partially disposed in the cavity. An aperture is formed as part of the outer sleeve such that the aperture is in fluid communication with the cavity. An inlet conduit is partially disposed in the aperture such that the inlet conduit is in fluid communication with the cavity. During operation of the injector, fluid flows through the inlet conduit and into the cavity, and from the cavity into the inlet tube.

When assembled, a portion of the inner sleeve obstructs the aperture, and the portion of the aperture that is unobstructed by the sleeve forms a flow path. The DEF flows from the inlet conduit, through the flow path and into the cavity, and then into the inlet tube.

In one embodiment, the outer sleeve, the inner sleeve, and the inlet tube are all formed using a stamping process, or a forming process, which reduces the cost of manufacturing the inlet port.

In one embodiment, the injector includes a volume reduction feature which is used to reduce the overall volume of the cavity of the outer sleeve. In one embodiment, the volume reduction feature is a semi-spherical wall portion formed as part of the outer sleeve. An upper wall is formed as part of the outer sleeve, and in one embodiment, the volume reduction feature is formed as part of the upper wall of the outer sleeve.

Reducing the volume in the cavity reduces the amount of DEF in the cavity, and therefore the overall amount of DEF in the injector. Reducing the overall volume of DEF in the injector reduces the overall volume expansion of the DEF when the DEF freezes. Less volume expansion by the DEF results in less strain on the components of the injector.

For injectors equipped with a purge function, where the DEF is purged from the injector under certain conditions, such as when the vehicle is shut off. Having the volume reduction feature results in less overall DEF in the injector, and therefore less DEF that needs to be purged. Additionally, when the conditions arise that necessitate the use of the injector, and the injector must be "primed," the DEF is pumped back into the injector. Having less volume results in less DEF being necessary to fully prime the injector.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3 is an enlarged sectional view of a compact side feed inlet port mounted to an injector, according to embodiments of the present invention;

FIG. 4 is an enlarged sectional view of an alternate embodiment of a compact side feed inlet port mounted to an injector, according to embodiments of the present invention;

DETAILED DESCRIPTION OF THE PREFERRED EMBODIMENTS

The following description of the preferred embodiment(s) is merely exemplary in nature and is in no way intended to limit the invention, its application, or uses.

Figure 1:
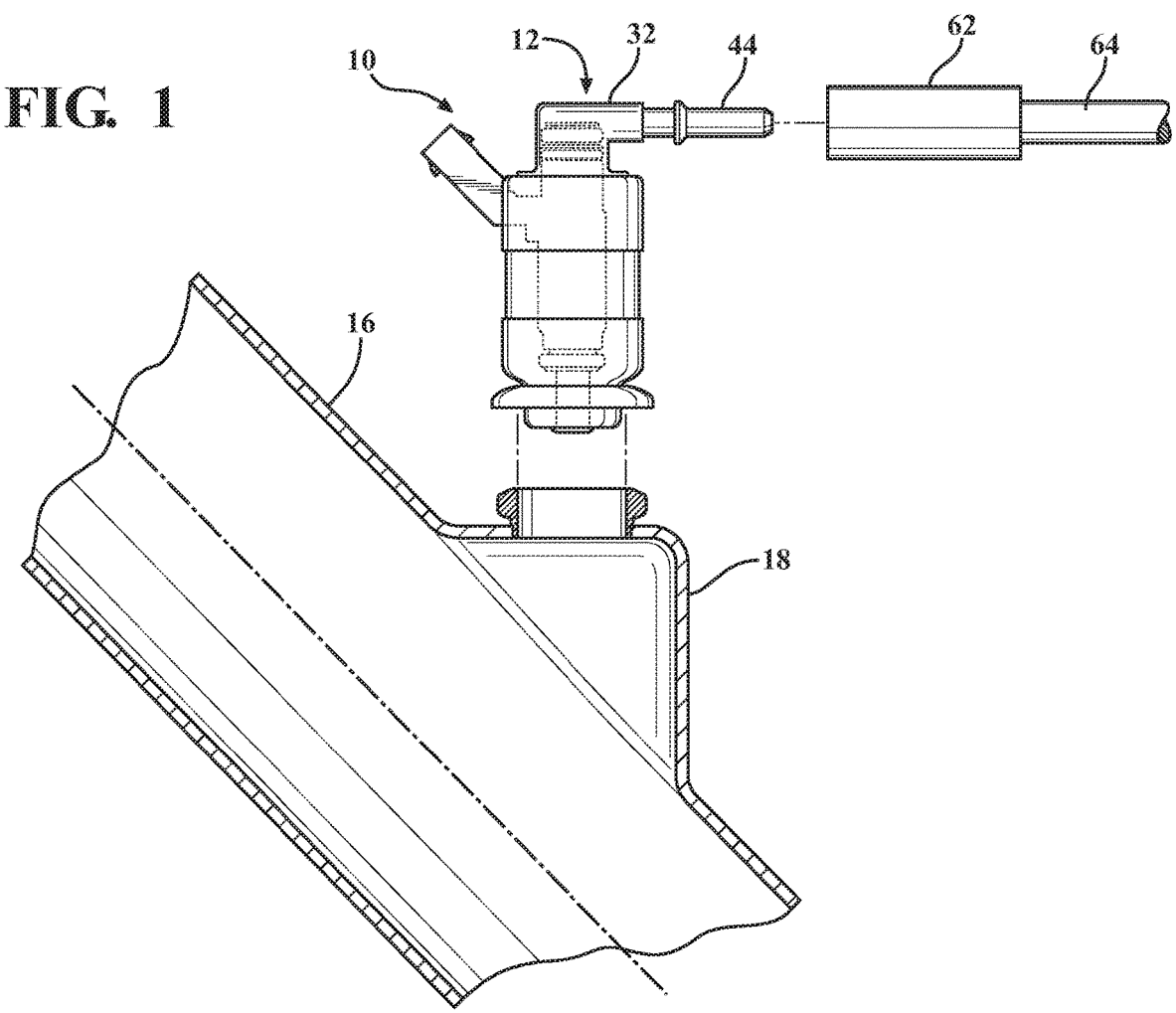
FIG. 1 is an exploded view of a portion of an exhaust system having an injector, according to embodiments of the present invention.
Figure 2:
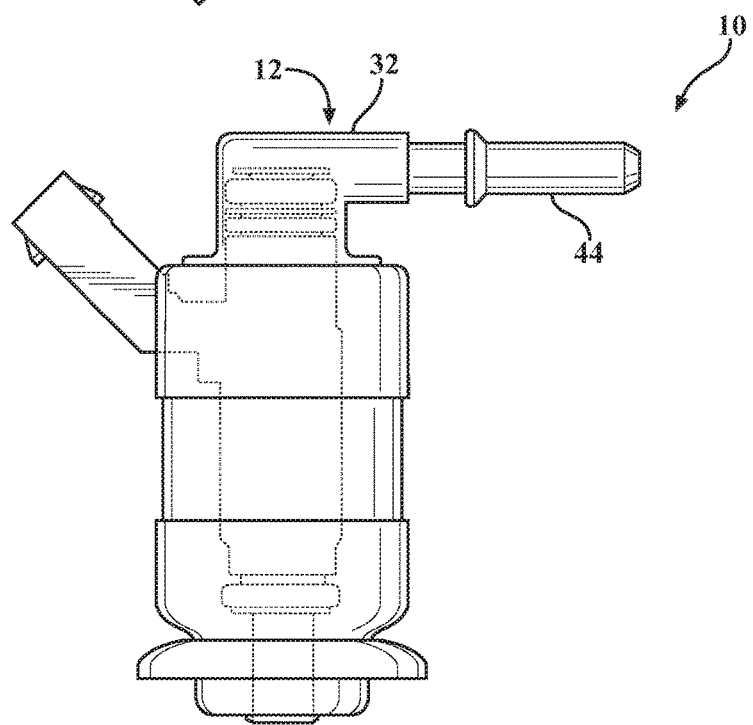
FIG. 2 is a side view of an injector having a compact side feed inlet port, according to embodiments of the present invention.

An injector having a side feed inlet port according to the present invention is shown in FIGS. 1-3 generally at 10. The injector 10 has a multi-piece inlet port, shown generally at 12, which receives diesel exhaust fluid (DEF). The inlet port 12 is connected to a hydraulic connection 62, which is connected to a hose 64 such that DEF is transferred from the hose 64 to the inlet port 12. The injector 10 also includes an inlet tube 14, where the DEF is able to flow from the inlet port 12 and into the inlet tube 14. Furthermore, the injector 10 also includes an actuator, such as a solenoid (not shown), which is used to control a valve assembly (not shown) for controlling the flow of DEF into an exhaust pipe 16. The exhaust pipe 16 includes an external mounting portion 18, that the injector 10 is mounted to.

Surrounding the inlet tube 14 is a first seal, which in this embodiment is an O-ring 20. The injector 10 also includes a housing 22 which surrounds a portion of the inlet tube 14. The housing 22 includes a groove 24, and disposed in the groove 24 is a second seal, which in this embodiment is another O-ring 26.

The inlet port 12 includes several components; one of the components is an inner sleeve 28. The inner sleeve 28 is generally cylindrical in shape, and has a flange portion 30. When the injector 10 is assembled, the inner sleeve 28 surrounds both of the O-Rings 20,26, which provide a sealing function to prevent DEF from migrating around the O-rings 20,26 into certain areas of the injector 10. The inner sleeve 28 also includes an aperture 28a, which DEF passes through prior to entering into the inlet tube 14.

The inlet port 12 also includes an outer sleeve 32, which is also cylindrical in shape, and includes a cavity, shown generally at 34. The outer sleeve 32 surrounds the inner sleeve 28, as shown in FIG. 3. The inner sleeve 28 may be press-fit into the outer sleeve 32, or the inner sleeve 28 may be connected to the outer sleeve 32 using a weld connection, along weld connection points 36,38. The inner sleeve 28 and outer sleeve 32 may also be connected together through a brazing process. The outer sleeve 32 also includes a cylindrical flange portion 40 having an aperture 42. An inlet conduit 44 is partially disposed in the aperture 42, such that the inlet conduit 44 is connected to the outer sleeve 32. The inlet conduit 44 may be disposed in the aperture 42 through a weld connection, press-fit connection, or the like. The inlet conduit 44 is connected to the hydraulic connection 62 to receive DEF from the hose 64.

The inner sleeve 28 includes a circumferential wall 46, and a portion of the circumferential wall 46 obstructs a portion of the aperture 42. The portion of the aperture 42 that is unobstructed provides a flow path, shown generally at 48. The inlet conduit 44 also includes an inlet aperture 50, and the DEF that flows into the inlet aperture 50 and through the inlet conduit 44 flows through the flow path 48 and into the cavity 34 of the outer sleeve 32. The DEF then flows into the inlet tube 14 from the cavity 34.

An area of the first O-ring 20 contacts the circumferential wall 46 of the outer sleeve 32, forming a sealing area, shown generally at 56. The size of the sealing area 56 may vary, depending upon the size of the O-ring 20, and how much the O-ring 20 is compressed, causing a greater or lesser amount of the outer surface of the O-ring 20 to contact the circumferential wall 46. The sealing area 56 has a center 56a, and the inlet conduit 44 has an axis 58 along the center of the inlet conduit 44, as shown in FIG. 3. The axis 58 is located at a distance 60 from the center 56a of the sealing area 56. This distance 60 may be varied, affecting the size of the flow path 48. The size of the flow path 48 may also be affected by changing the diameter of the inlet conduit 44 and correspondingly changing the diameter of the cylindrical flange portion 40, changing the position of the outer sleeve 32 relative to the inner sleeve 28, and changing the position of the cylindrical flange portion 40 relative to the outer sleeve 32. In this embodiment, the center 56a of the sealing area 56 is below the axis 58. However, it is within the scope of the invention that the position and size of any of the above mentioned components may be changed such that the center 56a of the sealing area 56 may be any distance 60 above or below the axis 58.

Each of the inner sleeve 28, the outer sleeve 32, and the inlet conduit 44 are made through a stamping process, and then assembled together during manufacturing.

Figure 5:
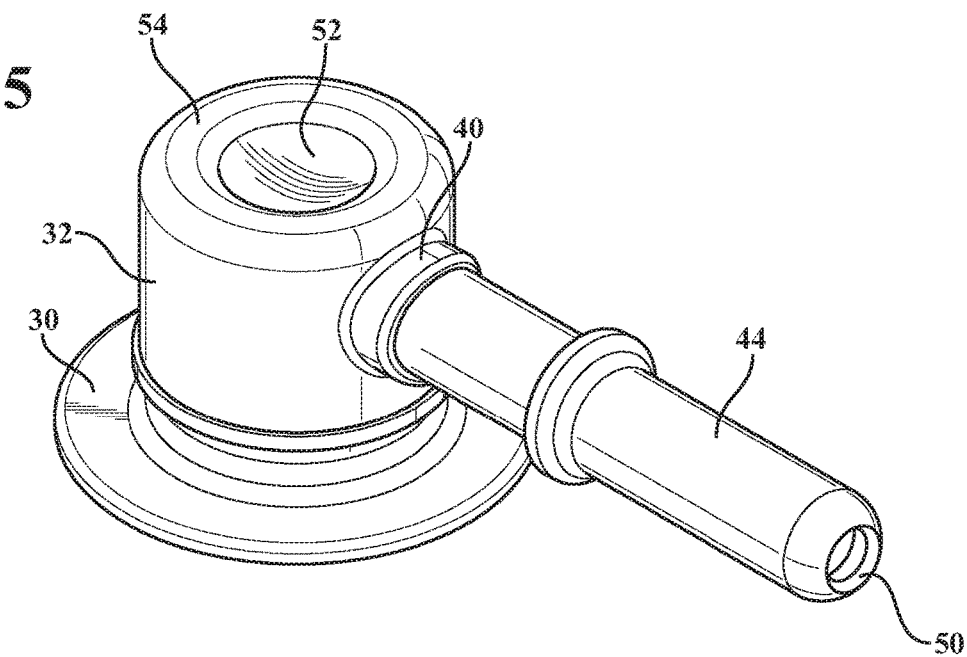
FIG. 5 is a perspective view of an alternate embodiment of a compact side feed inlet port mounted to an injector, according to embodiments of the present invention.
Figure 6:
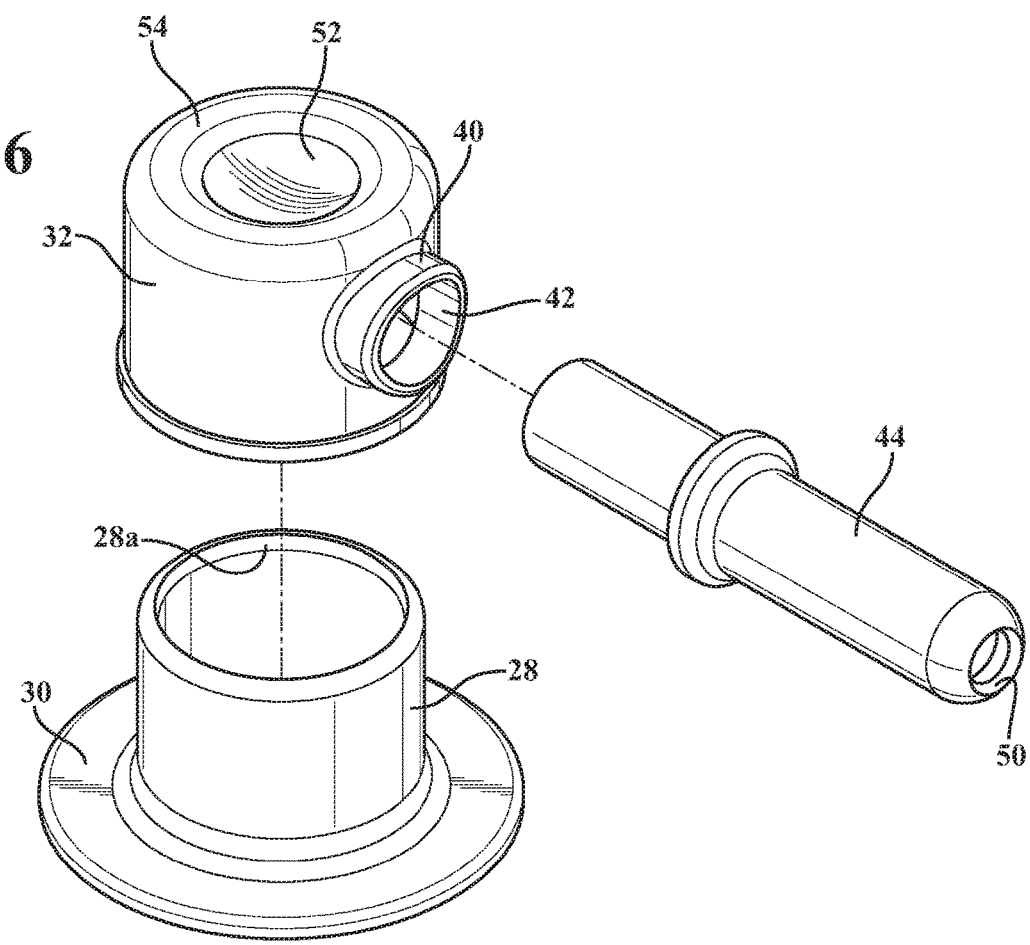
FIG. 6 is an exploded view of an alternate embodiment of a compact side feed inlet port mounted to an injector, according to embodiments of the present invention.

An alternate embodiment of the invention is shown in FIGS. 4-6. In this embodiment, the outer sleeve 32 also includes a volume reduction feature 52, which in this embodiment is a semi-spherical wall portion. The volume reduction feature 52 is formed as part of an upper wall 54 of the outer sleeve 32. The volume reduction feature 52 reduces the overall volume in the cavity 34 of the outer sleeve 32. In this embodiment, the volume reduction feature 52 has a radius of about six millimeters, and the shape of the volume reduction feature 52 reduces the volume of the cavity 34 by approximately 20%. However, it is within the scope of the invention that other dimensions and shapes may be used to form the volume reduction feature 52, changing the volume of the cavity 34. Reducing the volume in the cavity 34 reduces the amount of DEF in the cavity 34, and therefore the overall amount of DEF in the injector 10. Under certain conditions, the DEF may freeze when exposed to low temperatures. Some systems do not have the capability to purge the DEF when the vehicle is shut off, and the DEF may freeze (and expand) when exposed to low temperature. Reducing the overall volume of DEF in the injector 10 reduces the overall volume expansion of the DEF when the DEF freezes. Less volume expansion by the DEF results in less strain on the components of the injector 10.

There are some injectors which have a purge function. The injector 10 of the present invention may be equipped with this purge function, where the DEF is purged from the injector 10 under certain conditions, such as when the vehicle is shut off. Having the volume reduction feature 52 results in less overall DEF in the injector 10, and therefore less DEF that needs to be purged. Additionally, when the conditions arise that necessitate the use of the injector 10, and the injector 10 must be "primed," where the DEF is pumped back into the injector 10, having less volume results in less DEF being necessary to fully prime the injector 10.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus, comprising:
   an injector, including:
   an inlet port for transferring fluid to an inlet tube;
   an inner sleeve, the inner sleeve being part of the inlet port;
   an outer sleeve mounted to the inner sleeve, the outer sleeve being part of the inlet port;
   an inlet conduit partially disposed in the outer sleeve, the inlet conduit being part of the inlet port;
   a cavity formed at least partly by the outer sleeve;
   a volume reduction feature that is formed as part of the outer sleeve, wherein the volume reduction feature reduces the volume in the cavity;
   an upper wall formed as part of the outer sleeve, the volume reduction feature is formed as part of the upper wall of the outer sleeve;
   wherein fluid flows from the inlet conduit, into the cavity, and then into the inlet tube;
   wherein the volume reduction feature extends a majority of a distance between the inlet tube and an inner surface of a portion of the upper wall which does not form the volume reduction feature, wherein the volume reduction feature extends at least partly within the inner sleeve at a radial central portion thereof;
   wherein the inlet port is a side feed inlet port in which a longitudinal axis of the inlet conduit is orthogonal to a longitudinal axis of the injector;
   wherein fluid flows from the inlet conduit, through the outer sleeve and into the inlet tube; and
   wherein the volume reduction feature comprises a semi-spherical wall portion of the upper wall, a diameter of the semi-spherical wall portion extending a majority of a distance across an opening of the inlet tube.

2. The apparatus of claim 1, further comprising:
   an aperture formed as part of the outer sleeve;
   wherein a portion of the inlet conduit is disposed in the aperture formed as part of the outer sleeve, and the inlet conduit is in fluid communication with the cavity.

3. The apparatus of claim 2, further comprising:
   a flow path;
   wherein a portion of the inner sleeve obstructs a majority of the aperture, and the flow path is formed by the portion of the aperture that is unobstructed by the sleeve.

4. The apparatus of claim 1, wherein the outer sleeve, the inner sleeve, and the inlet tube are all separate components that are formed using one selected from the group consisting of a stamping process and a forming process.

5. The apparatus of claim 3, wherein a majority of the aperture is obstructed by the portion of the inner sleeve, the flow path being partly defined by a space between an outer surface of the inner sleeve and at least one of an inner surface of the outer sleeve and an end portion of the inlet conduit.

6. The apparatus of claim 1, further comprising a seal member disposed between an outer surface of the inlet tube and an inner surface of the inner sleeve, wherein a radial axis of the seal member at a center thereof is offset from a longitudinal axis of the inlet conduit.

7. The apparatus of claim 1, wherein the volume reduction feature reduces a volume of the cavity for receiving fluid by 20%.

8. The apparatus of claim 1, wherein an upstream opening of the inlet tube, relative to a direction of fluid flow through the inlet tube, is disposed within an opening of the inner sleeve.

9. The apparatus of claim 1, wherein the volume reduction feature does not directly contact the inner sleeve and does not directly contact the inlet tube.

10. An inlet port for an injector comprising:
    an inner sleeve mounted to an inlet tube of an injector;
    an outer sleeve, the inner sleeve partially disposed in the outer sleeve;
    a cavity formed as part of the outer sleeve, the inner sleeve partially disposed in the cavity;
    an aperture formed as part of the outer sleeve, the aperture in fluid communication with the cavity;
    an inlet conduit partially disposed in the aperture such that the inlet conduit is in fluid communication with the cavity;
    a volume reduction feature, wherein the volume reduction feature reduces the volume in the cavity and is formed as part of the outer sleeve;
    an upper wall formed as part of the outer sleeve, the volume reduction feature is formed as part of the upper wall of the outer sleeve; and
    a flow path, the inlet conduit in fluid communication with the cavity through the flow path;
    wherein the volume reduction feature extends a majority of a distance between the inlet tube and an inner surface of a portion of the upper wall which does not form the volume reduction feature, the volume reduction feature extending at least partly within the inner sleeve at a radial center portion of the inner sleeve;
    wherein a portion of the inner sleeve obstructs a majority of the aperture, and the flow path is formed by the portion of the aperture that is unobstructed by the inner sleeve;
    wherein fluid flows through the inlet conduit and into the cavity, and from the cavity into the inlet tube.

11. The inlet port of claim 10, wherein the outer sleeve, the inner sleeve, and the inlet tube are all formed using one selected from the group consisting of a stamping process and a forming process.

12. The inlet port of claim 10, wherein the volume reduction feature comprises a semi-spherical wall portion of the upper wall of the outer sleeve.

13. The inlet port of claim 10, wherein the inlet port is a side feed inlet port.

14. The inlet port of claim 10, wherein a longitudinal axis of the inlet conduit is orthogonal to a longitudinal axis of at least one of the inlet tube and the injector.

15. The inlet port of claim 10, wherein the flow path is defined in part by a space between an outer surface of the inner sleeve and at least one of an inner surface of the outer sleeve and an end portion of the inlet conduit.

16. The inlet port of claim 12, wherein a diameter of the semi-spherical wall portion of the upper wall of the outer sleeve is greater than a radius of an opening of the inner sleeve.

17. The inlet port of claim 12, wherein an upstream opening of the inlet tube, relative to a direction of fluid flow through the inlet tube, is disposed within an opening of the inner sleeve.

18. The inlet port of claim 12, wherein the volume reduction feature does not directly contact the inner sleeve and does not directly contact the inlet tube.

* * * * *